United States Patent [19]

Zhabokrug

[11] Patent Number: 5,060,685
[45] Date of Patent: Oct. 29, 1991

[54] SAFETY CAP FOR TIRE VALVE

[76] Inventor: Ilya Zhabokrug, 754 38th Ave., San Francisco, Calif. 94121

[21] Appl. No.: 599,618

[22] Filed: Oct. 18, 1990

[51] Int. Cl.$^5$ .................. F16K 15/20; B60C 29/06
[52] U.S. Cl. .................. 137/230; 137/512.3; 137/543.15
[58] Field of Search .................. 137/224, 230, 512.3, 137/543.15

[56] References Cited

U.S. PATENT DOCUMENTS

| 1,082,182 | 12/1913 | Van Winkle | 137/230 X |
| 1,086,550 | 2/1914 | Morrison | 137/230 X |
| 1,104,902 | 7/1914 | Jarvis | 137/230 |
| 1,250,503 | 12/1917 | Ray | 137/230 |
| 1,258,079 | 3/1918 | Young | 137/230 X |
| 1,539,865 | 6/1925 | Pratt | 137/230 |
| 1,605,643 | 11/1926 | Boll | 137/230 |
| 1,732,918 | 10/1929 | Sutton | 137/230 X |
| 2,505,949 | 5/1950 | DeVilbiss | 137/230 |
| 2,737,223 | 3/1956 | Plath | 137/230 X |
| 2,987,071 | 6/1961 | Haus | 137/230 |
| 4,660,590 | 4/1987 | Sanchez | 137/230 X |

Primary Examiner—John Rivell
Attorney, Agent, or Firm—Alex Shkolnik

[57] ABSTRACT

A safety cap (10) which is screwed onto an external thread (24) of standard tire valve (22) consists of a cylindrical body (11), a cup-shaped barrel (26) which is threaded onto an external thread (17) of the cylindrical body (11), and a control valve which consists of a plunger (42), a valve seat (50), a spring (46), and a guide pin (40). This valve is located in a space (B) formed between the inner face of a barrel bottom (30) and the facing end of the cylindrical body (11). The control valve is constantly adjusted, during the assembling of the safety cap at a factory, to a maximum pressure allowable for a predetermined tire. In case the pressure in the tire exceeds the maximum allowable value, e.g., because of an increased load or high temperature air will push the plunger (42) away from the tire valve and will be released into the atmosphere through a check valve (62). Thus the pressure in the tire will be automatically adjusted to a level not exceeding the maximum allowable one.

7 Claims, 1 Drawing Sheet 5,060,685

SAFETY CAP FOR TIRE VALVE

BACKGROUND

1. Field of the Invention

The present invention relates to tire valves, particularly to safety inflation and deflation valves and a cap for such valves.

2. Description of Prior Art

Vehicle tire manufacturers recommend that tire pressure be measured under a normal load [(i.e., a vehicle with one or two occupants) and moderate temperature, i.e., about +20° C. (68° F.)].

During driving, however, the tire may experience extreme conditions, such as a high ambient temperature, an increased load, and/or a long period of high-speed driving. Such extreme conditions may increase the pressure inside the tire to a value exceeding its upper allowable limit. This may cause the tire to blowout, i.e., violently rupture and tear, causing a total loss of pressure and collapse of the tire.

In the past, many types of valves have been devised to release excess pressure if it exceeds a predetermined maximum allowable level. One such device is described in U.S. patent application Ser. No. 07/481954 filed 02.20.90 by me with coinventors. This device comprises a special core for a standard tire valve. This core contains an additional safety valve adjusted under factory conditions to the maximum allowable pressure for each specific tire.

Although such a safety valve with an additional core is convenient for tires newly manufactured at automotive plants, they are inconvenient for installation on existing tires. This is because for installation of such a core into an existing tire, one has to completely deflate this tire, remove the old core, replace it with a new one, and then to inflate the tire to a pressure recommended for the tire of this type.

Another disadvantage of the safety valve with a new insert is that it is unsuitable for use with a standard cap normally threaded onto the tip of the tire valve for its protection from dirt, water, etc. This is because the standard cap would block a path for air to be released from the tire through the the safety valve proposed by the above-mentioned patent application. Therefore a nonstandard, i.e., specially designed cap is required.

As the new core, which contains a valve, has to be inserted into a small-diameter channel of an existing tire valve housing, its own channel is so small in diameter that the absolute value of air pressure developed in this channel is very low. Therefore technical problems may occur in selecting proper materials for the additional valve core. More specifically, this problem is associated with the construction of the spring which has to develop a force sufficient to deform the valve seal.

Another attempt to solve the above problem is to use special safety caps with means for generating a light signal when the pressure exceeds the maximum allowable level. Such safety tire-pressure indicating valve caps are produced commercially, e.g., by Herrington Co., Londonderry, N.H. 03053.

The main disadvantage of such safety caps is that they only give light signal indication about overinflation or underinflation of air pressure in the tire, but do not provide automatic control or adjustment of the tire pressure during driving. In order to check the pressure via a light indicating signal, the driver must stop the vehicle in a dark place, or at least in the shade, to clean the indicator head, if it is dirty, and then to adjust the pressure manually (after removing the cap), either by releasing the pressure, or by pumping additional air. In other words, this is a passive method of control. Moreover, it is inconvenient.

OBJECTS OF THE INVENTION

It is therefore an object of the present invention to eliminate the above disadvantages of known safety devices for tire valves, i.e., to provide a safety cap which can be screwed onto a standard tire valve, instead of its standard cap, and which incorporates means for automatically adjusting tire pressure to a level not exceeding the maximum allowable one. Still another object is to provide a tire safety cap which can easily fit onto existing tires as well as onto tires newly produced at the automotive plant. Another object is to provide the above adjustment automatically during running as well as during rest.

A further object is to provide a tire valve pressure-adjusting cap which combines the pressure adjusting function with protection of the tire valve from dirt and water. An additional object of the invention is to provide a tire valve safety cap which develops high values of absolute pressure and therefore facilitates selection of materials for valve parts. Another object is to provide a safety tire valve cap which is simple in construction, easy and inexpensive to manufacture, and convenient to use. Further objects and advantages will become apparent after consideration of the ensuing description and the accompanying drawings.

BRIEF DESCRIPTION OF THE DRAWINGS

FIGS. 1-2—Detailed Description of the Safety Tire Valve Cap of the Invention

Figure 1:
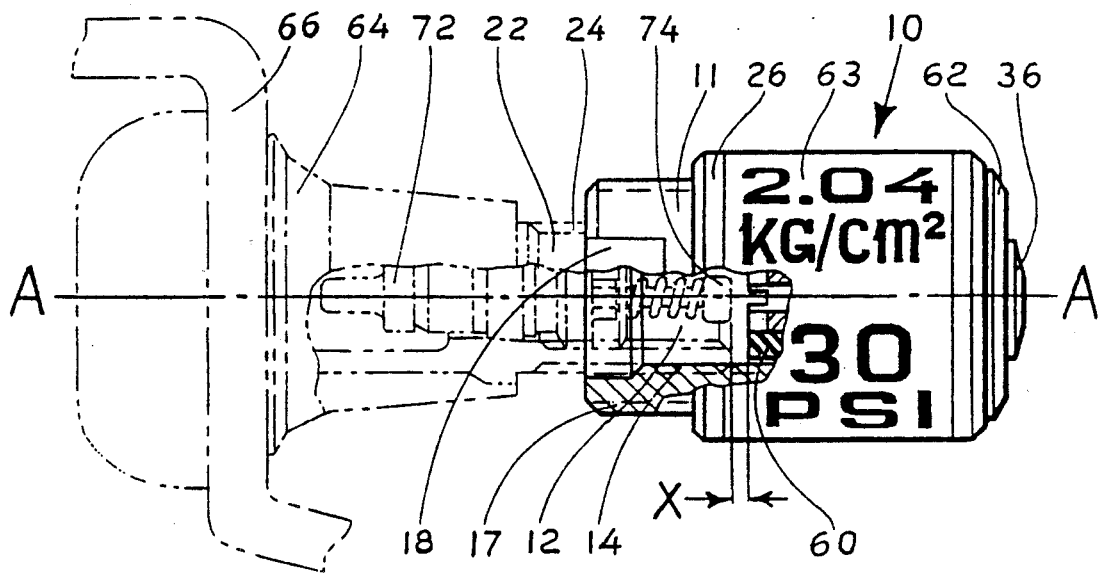
FIG. 1 is a side view of a safety tire valve cap of the invention with position of its parts during the installation of the cap onto a standard tire valve, portions of the cap and the tire valve being cut away to show the arrangement of the parts.
Figure 2:
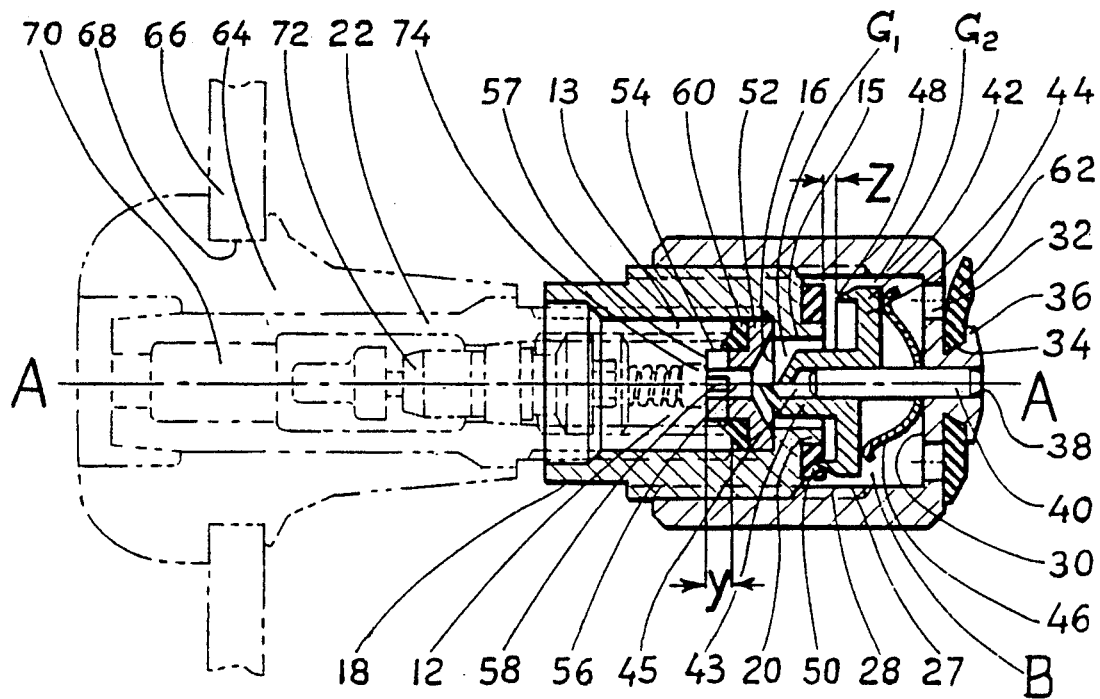
FIG. 2 is a sectional view of the safety tire cap along line II—II of FIG. 1; the portion of this sectional view above the longitudinal axis shows position of the cap's parts during release of excessive air, while the portion below the longitudinal axis shows position of the same parts when the cap's valve is closed.

A safety tire valve cap of the invention, which in general is designated by reference numeral 10, is shown in the accompanying drawings (FIGS. 1 and 2).

FIG. 1 is a side view of safety tire valve cap 1 with position of its parts during the installation of the cap onto a standard tire valve. The cap itself is drawn by a solid line, while the part drawn by a phantom line is a part of the wheel rim with a tubeless tire valve. In order to show the arrangement of parts, portions of the cap and the tire valve are cut away.

FIG. 2 is a sectional view of the safety tire cap along line II—II of FIG. 1 which shows all internal parts of the cap. The portion of this sectional view above the longitudinal axis A shows position of the cap's parts during release of excessive air, while the portion below the longitudinal axis A shows position of the same parts when the cap's valve is closed.

Cap 10 comprises a cylindrical body 11 with a stepped hole 12. A large-diameter step 13 has an internal thread 14, while a small-diameter step 15 is smooth. An external thread 17 is formed on the outer surface of body 11. Stepped hole 12 forms a shoulder 16. On its one end, body 11 has two flats 18 for a wrench. On the end opposite to flats 18, body 11 has a hollow journal 20. Internal thread 14 is used for screwing body 11 onto an external thread 24 of standard tire valve 22 shown by phantom lines.

A cup-shaped barrel 26 which has a bore 27 with an internal thread 28 is screwed onto external thread 17 of body 11, leaving a space B between bottom 30 of barrel 26 and facing end of body 11. In its bottom 30, barrel 26 has through openings or valve ports 32. A tail journal 34 with a shoulder 36 is formed on the outer side of bottom 30. A central hole 38 is drilled through tail journal 34.

A guide pin 40 is press-fitted into hole 38 so that its one end extends into bore 27, while the other end is made flush with the outer surface of shoulder 36.

A plunger 42, having a cylindrical portion 43 and a flange 44. The cylindrical portion of plunger 42 is placed with a running fit onto a guide pin 40 which is inserted into a central blind hole 45 of plunger 42, and a three-petal-type plate spring 46 is placed between plunger flange 44 and bottom 30 of barrel 26. On its periphery on the side opposite to spring 46, plunger 42 has a sharp shoulder or plunger skirt 48.

Cylindrical portion 43 of the plunger is located in small-diameter step hole 15, and an annular gap G1 is formed between this hole and the outer surface of plunger cylindrical portion 43. A valve seat 50 is fitted onto hollow journal 20 and can be attached to the surface of body 11, e.g., by glue.

Thus, plunger 42, valve seat 50, spring 46, and guide pin 40 form a control valve, which, as will be described later, is preliminarily and constantly adjusted to a required maximum allowable tire pressure.

An insert 52 is inserted into large-diameter step hole 13 of body 11 so that it rests on shoulder 16. On its side opposite to shoulder 16, insert 52 has a thrust journal 54. A central hole 56 passes through insert 52, and slots 58 are formed on a face 57 of thrust journal 54. A rubber seal 60 is fitted onto thrust journal 54.

For protection of the cap's interior against contamination from outside, e.g., because of penetration of dirt, water, etc., a rubber check valve 62 is snapped onto tail journal 34 and is held in place by shoulder 36. Under normal conditions, rubber check valve 62 closes valve ports 32 due to its resiliency.

Outer peripheral surface of barrel 26 is used for attaching a tag 63 which contains data required for a customer, e.g., the recommended tire pressure for a particular tire. Such a pressure is normally given in an operator's manual. This tag may comprise a piece of paper with an adhesive layer on one side (similar to a car registration tag).

In one concrete practical example, the safety tire valve cap had an outer diameter of 12 mm and an overall length of 20 mm. It is understood that these dimensions are given only as examples, since the final overall length of the cap depends not only on the type of the tire for which the cap is designed, but also on adjustment of plate spring 46.

Those parts which are shown in the drawings (FIGS. 1 and 2) by phantom lines do not belong to the object of the invention and relate to a tubeless tire valve and wheel. Their description, however, is necessary for better understanding the principle of the invention.

Reference numeral 64 designates a rubber sleeve which is rigidly and sealingly vulcanized to the above-mentioned tire valve housing 22. Reference numeral 66 designates a wheel rim which has a hole 68 for insertion of rubber sleeve 64. It is understood that air to the left from wheel rim 66 is under tire pressure, and to the right is under the atmospheric pressure, i.e., outside the tire.

Tire valve housing 22 has a through hole 70 which is open to the interior of the tire and serves for insertion of tire valve core 72.

As in any conventional tire valve, the one shown in the drawings has a valve pusher head 74. It is understood that when valve pusher head 74 is pressed into the valve housing, bleeding of air from the tire will occur. Normally, tire valve core 72 prevents release of air from the tire, the external face of valve pusher head 74 is approximately in the same plane as the end face of housing 22, and a distance X exists between the end face of valve pusher head 74 and face 57 of insert 52 (see FIG. 1). In addition to the above-mentioned gap G1 between plunger 42 and the inner walls of stepped hole 12, there is a gap G2 between the inner surface of barrel 26 and the outer periphery of plunger flange 44. Gaps G1 and G2 always exist.

FIGS. 1 and 2—Operation of the Safety Tire Valve Cap

In order to install safety tire valve 10 of the invention, it is first necessary to remove a conventional tire valve cap (not shown in the drawings), if the one is present (many car owners do not use such caps at all, if weather conditions allow to keep valve pusher head 74 clean and exposed). After that, safety tire valve 10 is threaded with internal thread 14 of its body 11 onto external thread 24 of valve housing 22.

As cap 10 is screwed onto tire valve housing 22, face 57 of thrust journal 54 of insert 52 approaches the face of valve pusher head 74, so that distance X is gradually reduced and disappears when both faces come into contact. With further movement of cap 10 in the axial direction toward the tire valve, rubber seal 60 is compressed between insert 52 and the outer end of tire valve housing 22. This action sea the threaded connection, i.e., threads 14 and 24, between body 11 and valve housing 22. When threading of cap 10 onto valve housing 22 is continued with an axial displacement for a distance Y (see FIG. 2), valve pusher head 74 is pushed into the valve housing and via through opening 70, face slots 58, central opening 56, and gap G1, compressed air penetrates from the tire into the space formed between plunger 42 and valve seat 50. In case plate spring 46 is stronger than pressure in the tire, release of air from the tire is impossible, i.e., plunger skirt 48 will remain in tight contact with valve seat 50. If, however, the pressure in the tire exceeds the force of spring 46, air will push plunger 42 away from the tire valve, whereby a gap Z is formed. As a result, air will flow through gap Z and gap G2 into space B and then is released into the atmosphere through valve ports 32 by opening check valve 62.

During the manufacture, each safety cap 10 is supplied with tag 63 which marks air pressure recommended for inflation of a predetermined tire under normal conditions (20° C. and rated car load). After assembling in the factory, each safety cap is adjusted to a required maximum permissible pressure, and then barrel 26 is rigidly fixed with regard to body 11, e.g., by a drop of an adhesive substance. Such an adhesive may be comprised of a water- and oil-proof glue. For adjustment, the unit, which has been preliminarily connected to a source of compressed air under a required pressure, is immersed into water, and the movement of the barrel with respect to the body is discontinued when air bubbles starts to appear from under check valve 62.

Summary, Ramifications, and Scope

As I have shown, my safety tire valve cap eliminates disadvantages inherent in known safety devices for tire valves, and provides a safety cap which can be screwed onto a standard tire valve, instead of its standard cap, and which incorporates means for automatically adjusting tire pressure to a level not exceeding the maximum allowable one. The cap of the invention can be easily fitted onto existing tires as well as onto tires newly produced at the automotive plant, provides the above adjustment automatically during running as well as during rest, combines the pressure adjusting function with protection of the tire valve from dirt and water, develops high values of absolute pressure and thus facilitates selection of materials for valve parts. It is simple in construction, easy and inexpensive to manufacture, and convenient to use.

Although the invention has been shown and described in the form of the preferred embodiment, it is understood that its parts and configurations were given as examples, and that many other modifications of the cap are possible. For example, insert 52 can be made not as an independent part, but as an integral part of body 11. Sharp shoulder or plunger skirt 48 can be formed on the end face of body 11 with valve seat 50 being attached to plunger 42. Valve ports 32 can be formed in the side wall of barrel 26 which may have an annular groove for locating a rubber ring to fulfill the function of check valve 62. Therefore the scope of the invention should be determined, not by examples given, but by the appended claims and their legal equivalents.

I claim:

1. A safety cap for tire valve comprising:
   a hollow cylindrical body with means for removably connecting said body to a valve housing of a tire valve with a valve pusher head;
   a cylindrical barrel with means for connecting said barrel to said hollow cylindrical body, said barrel having a bottom and forming a space between said bottom and said hollow cylindrical body;
   a control valve preliminarily and constantly adjusted to a maximum allowable pressure for a predetermined tire, said control valve being located in said space;
   means for carrying out said preliminary adjustment;
   means for sealing said connection between said hollow cylindrical body and said tire valve housing;
   means for pushing said valve pusher head into said tire valve for opening said tire valve and passing air through said pushing means;
   said control valve comprises: a plunger moveable in said space in the axial direction of said cap, said plunger having a sharp shoulder on its periphery on one side; a valve seat on the end of said body facing said sharp shoulder; and resilient means located between said bottom of said barrel and the side of said plunger opposite to said sharp shoulder;
   said pushing means comprises an insert inserted into said hollow body, and said sealing means comprises a resilient seal ring placed onto the side of said insert facing said tire valve housing;
   said insert has a through hole and at least one face slot on its side facing said tire valve, said plunger having a cylindrical portion and a flange portion, said sharp shoulder being formed on said plunger flange on its side facing said valve seat, said barrel having a guide pin press fitted into its bottom and extending into said space between said bottom and said hollow cylindrical body, said plunger being slidingly fitted onto said pin for movement in said axial direction.

2. The safety valve of claim 1, wherein said cylindrical body has a stepped hole consisting of a large-diameter step and a small diameter step, an internal thread of said cylindrical body being formed in said large-diameter step, said cylindrical portion of said plunger being located in said small-diameter step, gaps being formed and constantly present between the inner surface of said small-diameter step and the outer surface of said plunger cylindrical portion, as well as between the inner surface of said barrel and the outer surface of said plunger flange.

3. The safety cap of claim 2 wherein said resilient seal ring is made of a material having low residual deformation.

4. The safety cap of claim 3, wherein said means for connecting said barrel to said hollow cylindrical body comprises an inner thread formed in said barrel and an outer thread formed on the outer surface of said hollow cylindrical body.

5. The safety cap of claim 3, further provided with means for protecting said space against contamination from the outside, said means for protecting said space comprising holes made in said barrel and connected to said space, and a check valve normally closing said holes.

6. The safety cap of claim 3, wherein said barrel carries a tag with data.

7. The safety cap of claim 6, wherein said data is tire pressure recommended for said tire.

* * * * *